(12) United States Patent
Noro

(10) Patent No.: US 7,933,703 B2
(45) Date of Patent: Apr. 26, 2011

(54) CONTROL SYSTEM OF OPEN/CLOSE PART FOR A VEHICLE

(75) Inventor: Yoshiki Noro, Wako (JP)

(73) Assignee: Honda Motor Co., Ltd., Tokyo (JP)

( * ) Notice: Subject to any disclaimer, the term of this patent is extended or adjusted under 35 U.S.C. 154(b) by 933 days.

(21) Appl. No.: 11/750,065

(22) Filed: May 17, 2007

(65) Prior Publication Data

US 2007/0294006 A1 Dec. 20, 2007

(30) Foreign Application Priority Data

May 23, 2006 (JP) .................................. 2006-142210

(51) Int. Cl.
*B60J 1/00* (2006.01)
(52) U.S. Cl. .......................................................... 701/49
(58) Field of Classification Search ...................... 701/36
See application file for complete search history.

(56) References Cited

U.S. PATENT DOCUMENTS

| | | | | |
|---|---|---|---|---|
| 6,100,658 A * | 8/2000 | Kume et al. | ..................... | 318/286 |
| 6,894,451 B2 * | 5/2005 | Shinohara | ..................... | 318/566 |
| 6,906,482 B2 * | 6/2005 | Shimizu et al. | ............... | 318/286 |
| 7,250,736 B2 * | 7/2007 | Hirai | ............................. | 318/266 |
| 7,411,364 B2 * | 8/2008 | Takahashi | ..................... | 318/286 |
| 7,508,150 B2 * | 3/2009 | Takahashi | ..................... | 318/449 |
| 2003/0137265 A1 * | 7/2003 | de Frutos | ..................... | 318/468 |
| 2004/0130285 A1 * | 7/2004 | Le Gallo | ........................ | 318/466 |
| 2004/0178758 A1 * | 9/2004 | Shinohara | ..................... | 318/469 |
| 2004/0212338 A1 * | 10/2004 | Shimizu et al. | ............... | 318/469 |
| 2006/0220604 A1 * | 10/2006 | Hirai | ............................. | 318/286 |

FOREIGN PATENT DOCUMENTS

| JP | 07-238742 | 9/1995 |
|---|---|---|
| JP | 11-268531 | 10/1999 |
| JP | 2004-169276 | 6/2004 |

* cited by examiner

*Primary Examiner* — Thomas G Black
*Assistant Examiner* — Shelley Chen
(74) *Attorney, Agent, or Firm* — Rankin, Hill & Clark LLP

(57) ABSTRACT

A control system of an open/close part for a vehicle includes an open/close part which can open or close, installed at an opening of a vehicle, a driving device supplying power for operating the open/close part, a load detection unit detecting a load of operation applied to the driving device, and a controller controlling the driving device through detecting a position of the open/close part, wherein, while the open/close part is being operated, the controller performs detection on a foreign object being trapped by determining whether the operation load applied to the driving device detected by the load detection unit is larger than a pre-determined threshold, and wherein, if the controller determines that a pre-determined condition based on a pre-determined manipulation is satisfied, the controller performs detection on a foreign object being trapped using a second threshold which is smaller than the pre-determined threshold.

13 Claims, 6 Drawing Sheets

CONTROL SYSTEM OF OPEN/CLOSE PART FOR A VEHICLE

CROSS REFERENCE TO RELATED APPLICATIONS

This application claims the foreign priority benefit under Title 35, United States Code, §119(a)-(d) of Japanese Patent Application No. 2006-142210 filed on May 23, 2006 in the Japan Patent Office, the disclosures of which are herein incorporated by reference in its entirety.

BACKGROUND OF THE INVENTION

1. Field of the Invention

The present invention relates to a control system of an open/close part for a vehicle, especially a control system of an open/close part for a vehicle which can prevent a detection error on a foreign object being trapped in the open/close part.

2. Description of the Related Art

Conventionally, an open/close apparatus, which drives an open/close part for a vehicle such as a window glass or a slide shade of a vehicle using a motor, has been utilized for operating an open/close part for a vehicle. An open/close apparatus with a detection means for detecting a foreign object being trapped while an opening or a closing operation is being operated is known.

For example, according to paragraphs 0017 to 0029 and FIG. 1 of Japanese Laid-open Patent Application Publication No. 2004-169276, an open/close apparatus of a window for a vehicle is disclosed, wherein a detection error on a foreign object being trapped is prevented by determining if trapping occurs taking into consideration an impact applied to the vehicle which is detected using an impact detection means, together with variation of rotation of a motor which drives an open/close part of the vehicle.

Because a detection error may occur in detection on a foreign object being trapped due to an increase in trapping load resulting from an error attributed to car building and caused after the car is used for a long period, even if such a detection means for preventing a detection error on a foreign object being trapped is used, the detection error will be repeated unless the phenomenon that causes the detection error is removed. Especially, because the increase in trapping load resulting from the error attributed to car building and caused after the car is used for a long period may not occur consistently, a detection error on a foreign object being trapped may occur, even after a serviceman concludes that the cause of the detection error is removed from the vehicle which was brought to a service factory of a dealer by a user because of a detection error.

Accordingly, with the drawback of the prior art in view, the present invention provides a control system of an open/close part for a vehicle which can prevent a detection error on a foreign object being trapped, even if the cause is attributed to a phenomenon which does not occur consistently.

SUMMARY OF THE INVENTION

The present invention seeks to overcome the drawback of the prior art in view, and a control system of an open/close part for a vehicle including an open/close part which is installed at an opening of a vehicle and can open and close, a driving device which supplies power for opening or closing the open/close part, a load detection unit for detecting load of operation applied to the driving device, and a controller for controlling the driving device through detecting a position of the open/close part, wherein the controller performs detection on a foreign object being trapped for determining whether the operation load applied to the driving device detected by a load detection unit during the open/close part is operating is larger than a pre-determined threshold, and then, if it is determined that the pre-determined condition is satisfied, the controller performs detection on a foreign object being trapped using a second threshold smaller than the pre-determined threshold.

Detection on a foreign object being trapped can be performed at a smaller threshold than usual only when a pre-determined condition is satisfied.

A control system of an open/close part for a vehicle, including a manipulation unit which outputs a manipulation signal for switching to open or to close the open/close part, and an engine switch which has an ON position which indicates that an engine of the vehicle is being operated and outputs a position signal in response to the ON position, wherein the controller acquires a manipulation signal from the manipulation unit, at the moment the controller acquires the ON position signal from the engine switch.

Detection on a foreign object being trapped can be performed using a smaller threshold than usual when an open/close part is manipulated, at the moment the engine switch is turned to the ON position.

In a control system of an open/close part for a vehicle, a pre-determined condition is that the controller determines that an open/close part is in a fully opened state at the moment the controller acquires the ON position signal from the engine switch, and a manipulation signal for operating the open/close part to open.

According to the present invention, if an open/close part is in a fully opened state and is operated to open at the moment the engine switch is turned to the ON position, detection on a foreign object being trapped can be performed at a smaller threshold than usual.

In the control system of an open/close part for a vehicle, a terminal unit is connected to the controller in communication possible state, and a pre-determined condition is that the controller acquires a pre-determined signal from the terminal unit.

According to the present invention, detection on a foreign object being trapped is possible at a smaller threshold than usual when a pre-determined signal is transmitted from the terminal unit connected to the controller.

According to the present invention, an open/close part is a window glass or a slide roof.

In a control system of an open/close part for a vehicle, the open/close part is a plurality of window glasses, including a manipulation unit installed at each window which outputs a manipulation signal for operating the window glass to open or to close, and an engine switch which has an ON position which indicates that an engine of the vehicle is being operated and outputs a position signal in response to the ON position, wherein a pre-determined condition is that, at the moment the controller acquires the ON position signal from the engine switch, the controller acquires a manipulation signal for operating the first window glass and a manipulation signal for operating the second window glass concurrently.

According to the present invention, detection on a foreign object being trapped is possible using a smaller threshold than usual when both the windows at the driver seat side and at the front passenger seat side are manipulated concurrently, for example.

In a control system of an open/close part for a vehicle, an operation of the first window glass is for opening and an operation of the second window glass is for closing.

According to the present invention, detection on a foreign object being trapped is possible using a smaller threshold than usual when the driver seat side window is operated to open and the front passenger seat side window is operated to close, concurrently, for example.

According to the present invention, detection on a foreign object being trapped can be performed using a second threshold smaller than usual, only when a pre-determined condition is satisfied. Accordingly, upon request for repair from a user for the reason of a detection error, it is possible to check if a detection error occurs, and to prevent a detection error after repair, even if it is attributed to a phenomenon which does not occur consistently. It becomes possible for a car manufacturer or a slide roof manufacturer to ship a car guaranteeing that a detection error will not occur under a pre-determined condition, through checking if a detection error occurs, referring to a second threshold as a criterion. Because the possibility of parts exchange or removal of the circumference parts of a door is high with regard to the window glasses of a vehicle, it becomes easy to verify the soundness of the adjustment after attaching parts, and a working efficiency of the verification will increase.

DESCRIPTION OF THE PREFERRED EMBODIMENTS

Detailed description is given, referring to the attached drawings, on a control system of an open/close part for a vehicle according to the embodiments of the present invention. Here, description is made referring to a slide roof installed on a fixed roof of a vehicle as an open/close part for a vehicle, in the embodiments.

Figure 1:
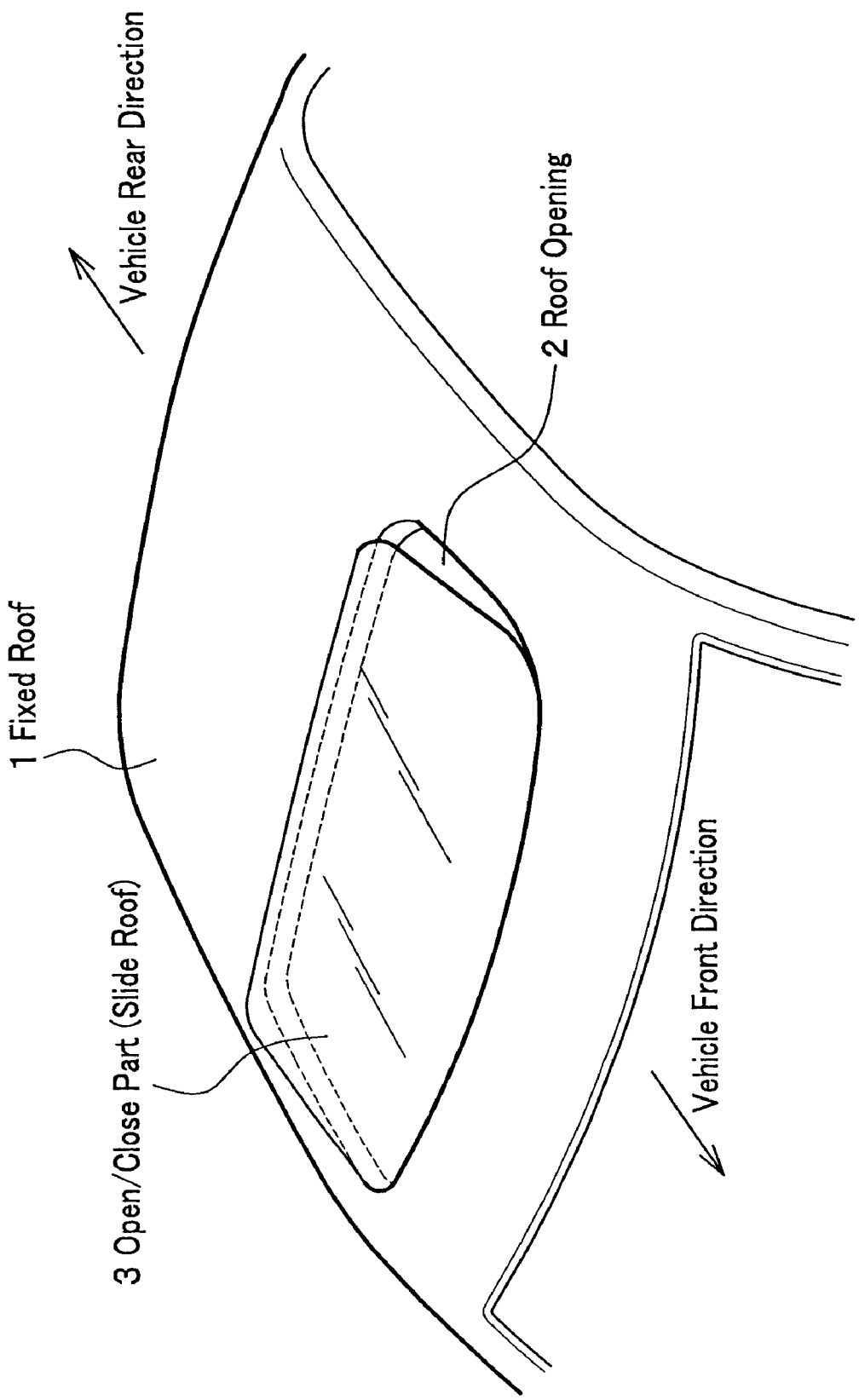
FIG. 1 illustrates an exploded perspective view of an opening on a roof equipped with a slide roof.

FIG. 1 illustrates an exploded perspective view of an opening on a roof equipped with a slide roof, according to the present invention. As shown in FIG. 1, a roof opening 2 is installed on a fixed roof 1 of the vehicle, and the slide roof 3 which closes the roof opening 2 can move in a rear direction of the vehicle.

The slide roof 3 performs a sliding operation between a fully opened slide position and a fully closed slide position through moving a push and pull cable (not illustrated) which is driven by a motor 4 referred to hereinafter, and performs a tilting operation which tilts the slide roof 3 by lifting the rear end side from the fully closed slide position (refer to FIG. 2).

A front direction and a rear direction of the vehicle are indicated by the arrows in FIG. 2.

FIG. 2 illustrates operation positions of a slide roof 3. FIG. 2A shows a fully tilted up slide position where only the rear end of the slide roof 3 is lifted in tilted state to a possible highest position and then tilting up stops, FIG. 2C shows a sliding position where the slide roof 3 is moving between a fully opened slide position and a fully closed slide position, and FIG. 2D shows a fully opened slide position where the slide roof 3 moves to the rear end and sliding stops at a fully opened position.

Figure 2A:
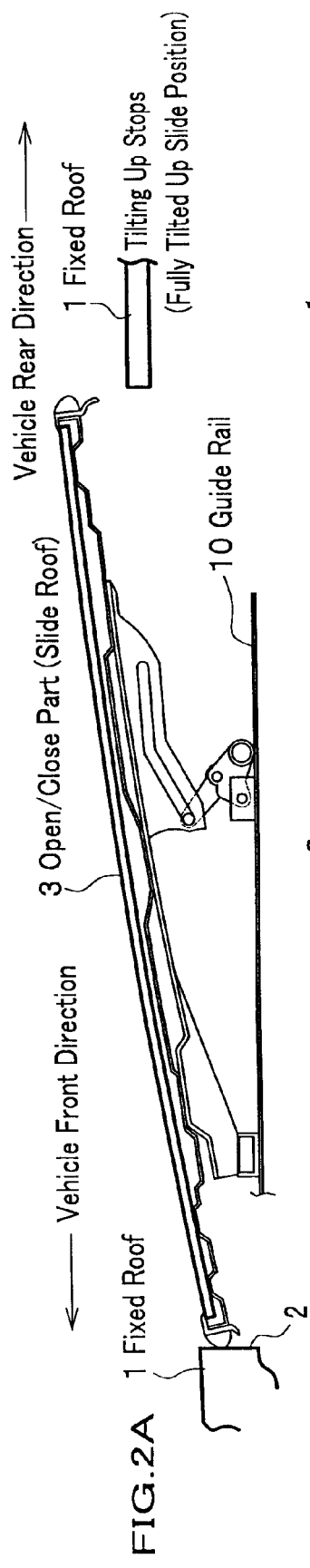
FIG. 2A to 2D illustrate operation positions of a slide roof, wherein FIG. 2A to 2D indicate a fully tilted up slide position, a fully closed slide position, a sliding position and a fully opened slide position, respectively.
Figure 2B:
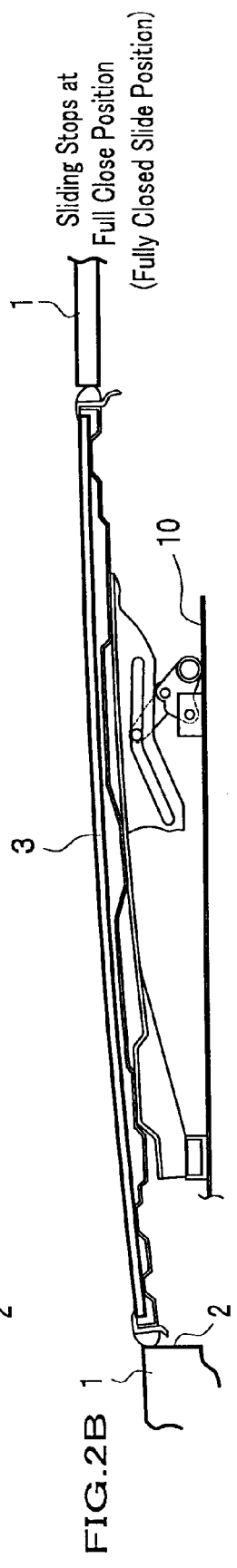
Figure 2C:
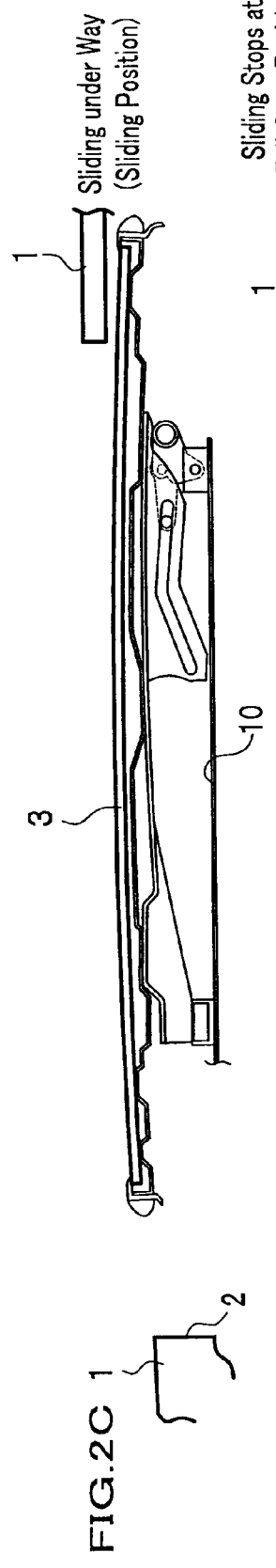
Figure 2D:
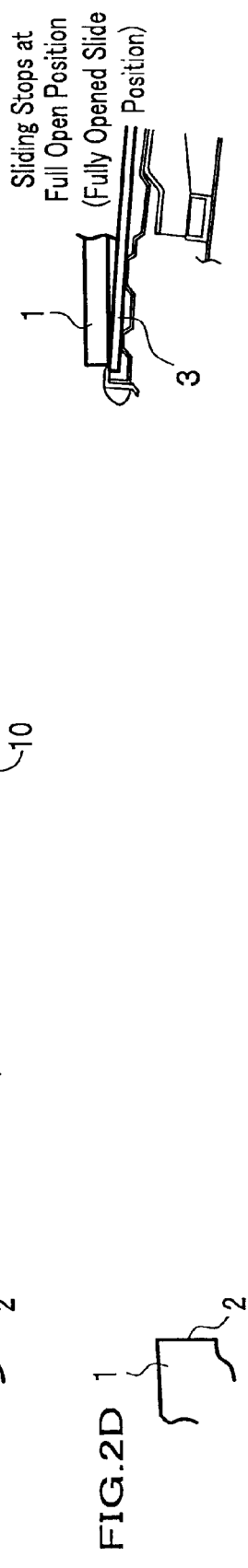

The slide roof 3 moves to the slide position indicated in FIG. 2C from the fully opened slide position indicated in FIG. 2D, by the rotation of the motor 4 in a pre-determined direction, and moves in a direction to close the roof opening 2, and the slide roof 3 closes the roof opening 2 by moving to the fully closed slide position indicated in FIG. 2B.

The slide roof 3 performs tilting up motion from the fully closed slide position indicated in FIG. 2B, by the rotation of the motor 4 further in a pre-determined direction, and stops at a highest lifted position (fully tilted up slide position), lifting the rear end side of the slide roof 3 in a tilted state, as illustrated in FIG. 2A.

When the motor 4 rotates in a direction opposite to a pre-determined direction at the fully tilted up slide position illustrated in FIG. 2A, the rear end of the slide roof 3 lowers in a tilted state and reaches the fully closed slide position illustrated in FIG. 2B. When the motor rotates in the same direction further, the slide roof 3 slides along the guide rail 10 as illustrated in FIG. 2C, and stops at the fully opened slide position indicated in FIG. 2D.

In this way, the operation of the slide roof 3 is determined by a rotation direction and a rotation number of the motor 4, that is, the slide positions of the slide roof 3 illustrated in FIG. 2A and FIG. 2B can be controlled using a pulse count number obtained by counting the pulse signals output in response to a rotation number of the motor 4.

Figure 3:
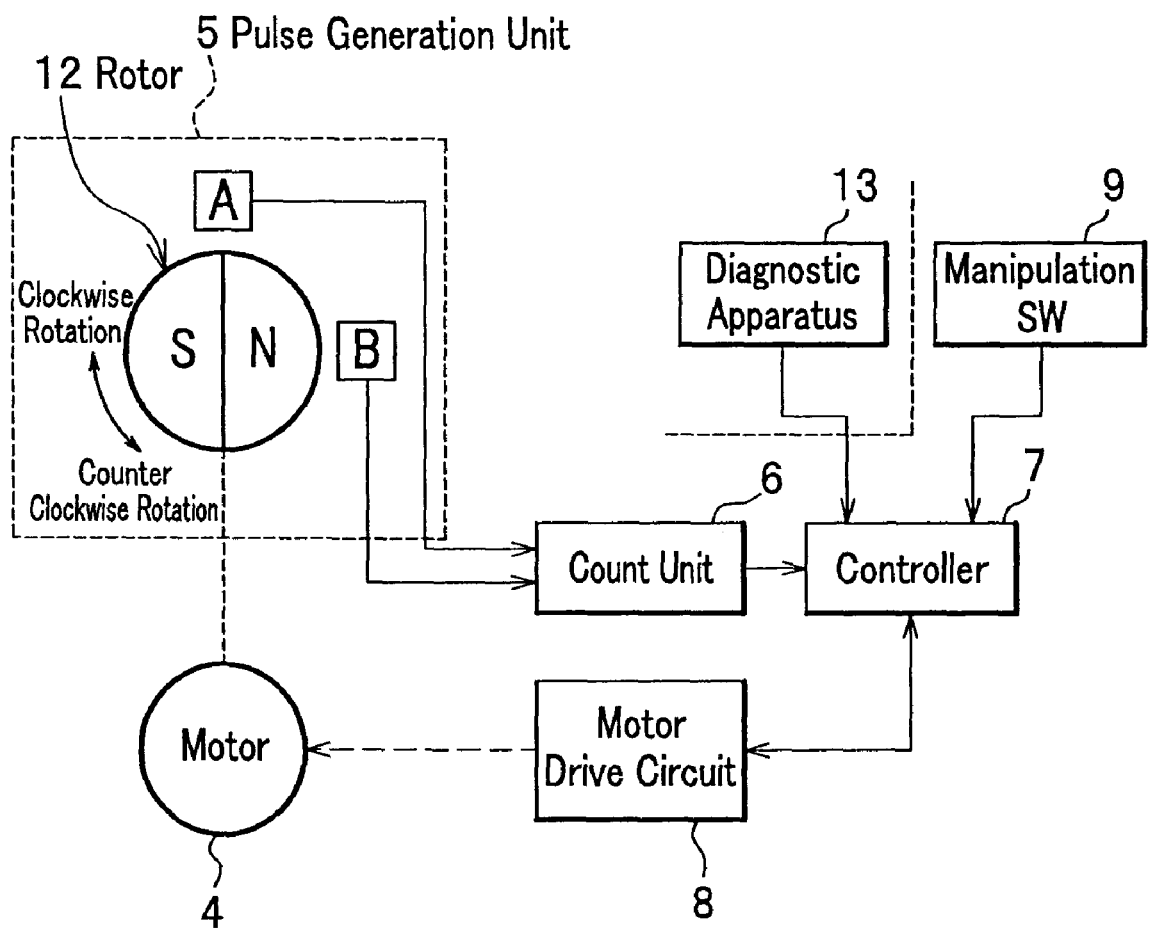
FIG. 3 is a block diagram illustrating a configuration of a control system of an open/close part for a vehicle.

FIG. 3 is a block diagram illustrating a configuration of a control system of an open/close part for a vehicle. As illustrated in FIG. 3, a control system of an open/close part for a vehicle includes a motor 4 for driving a slide roof 3 (corresponding to the driving device in the scope of claims), a pulse generation unit 5 which generates pulse signals in response to a rotation of the motor 4, a count unit 6 which outputs pulse count numbers through counting up or counting down pulse signals referring to the mechanical lock position of the slide roof 3 as an origin, a controller 7 (corresponding to the controller in the scope of claims) which controls the motor 4 in response to a pulse count number from the count unit 6, a motor drive circuit 8 which outputs a manipulation signal to the motor 4 for driving the motor 4 in response to a control signal output from the controller 7, a manipulation switch (SW) 9 which outputs a manipulation signal for indicating an operation of the slide roof 3 in response to a manipulation by a user, etc. The controller 7 operates the sliding roof 3 to open or to close in either an auto mode or a manual mode, in response to a manipulation signal from the manipulation switch 9. In the controller 7 of the control system of an open/close part for a vehicle according to the present embodiment, a diagnostic apparatus 13 (corresponding to the terminal unit in the scope of claims) which a serviceman, etc., uses for checking the operation condition of the controller 7, is connected to CAN (Controller Area Network) or LIN (Local Interconnect Network) through an in-vehicle network,.

The auto mode means a mode in which the controller 7 moves the slide roof 3, from the fully tilted up slide position to the fully closed slide position (or the reverse), or from the fully opened slide position to the fully closed slide position (or the reverse), in response to a pre-determined manipulation signal input from the manipulation switch 9. The manual mode means a mode in which, in response to a manipulation signal, only while the operation signal is kept, prior to the auto mode, the controller 7 moves the slide roof 3 in a closing direction (closing direction, hereinafter), or in an opening direction (opening direction, hereinafter), or in a tilting up direction (tilting up direction, hereinafter) or in a tilting down direction (tilting down direction, hereinafter).

The pulse generation unit 5 is a publicly known pulse generation apparatus, and is connected to an output axis of the motor 4, including a rotor 12 composed of a magnet with a N pole and a S pole, wherein two sensors of A and B both composed of Hall IC's which output pulse signals in response to a detected magnetic field, are arranged at positions 90 degrees apart from the axis center of the rotor 12, around the rotor 12. Due to this configuration, the sensors A and B output pulse signals synchronized with a rotation of the motor 4, and the pulse signals are output with a phase difference of 90 degrees.

The count unit 6 detects a rotation direction of the motor 4 (a clockwise rotation, a counterclockwise rotation), and, based on the rotation direction and the pulse signals, outputs a pulse count number through counting up or counting down the pulse signals referring to the mechanical lock position of the slide roof 3 as an origin. The count unit 6 can be included in the controller 7.

The controller 7 stores information on relation of each stop position of the slide roof 3 with a corresponding pulse count number, and a present pulse count number, in a memory (not illustrated), and, in response to a manipulation signal input from the manipulation switch 9, outputs a control signal for moving the slide roof 3 between the fully tilted up slide position and the fully closed slide position, or between the fully opened slide position and the fully closed slide position, to the motor drive circuit 8, in the auto mode.

The manipulation switch 9 is manipulated for commanding the slide roof 3 to either open or close, and a manipulation signal is output to the controller 7, in response to a manipulation when a user, etc., manipulates the switch 9.

The controller 7 can be constituted by a known computer equipped with ROM (Read Only Memory), RAM (Random Access Memory) and CPU (Central Processing Unit), etc., and the computer acts as the controller 7, by running an exclusive program stored in ROM.

Next, a mechanism for controlling the slide roof 3 in the control system of an open/close part for a vehicle is described.

Figure 4A:
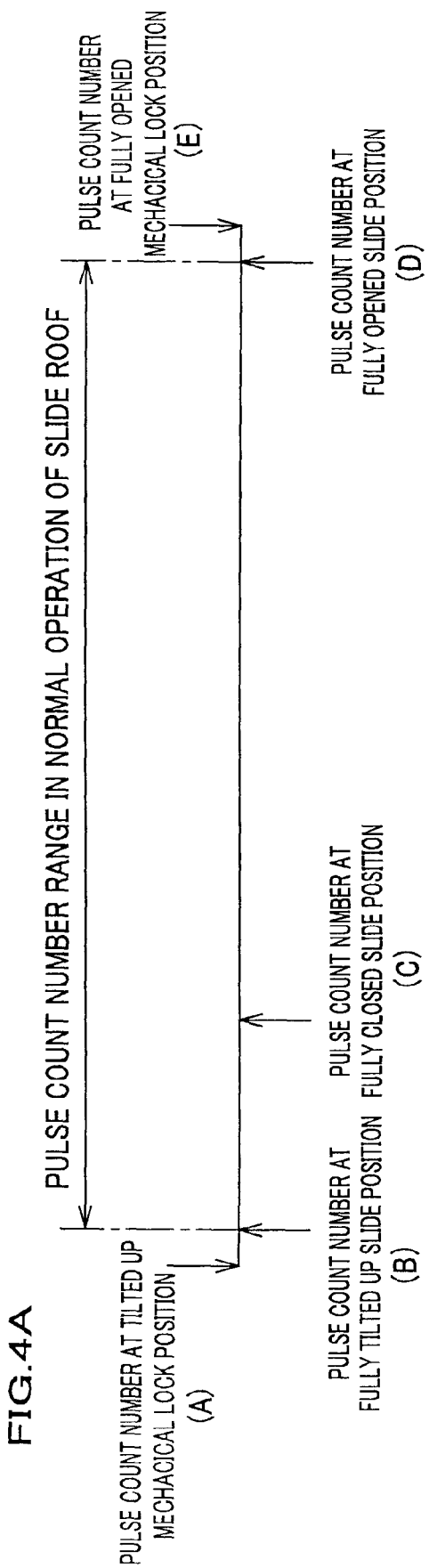
FIGS. 4A to 4C illustrate operation positions of the slide roof at a pulse count number obtained by counting pulse signals, wherein FIG. 4A to 4C indicate a position of the slide roof at the pulse count number, relation between sensors and a rotor, and pulse signals generated by the sensors, respectively.
Figure 4C:
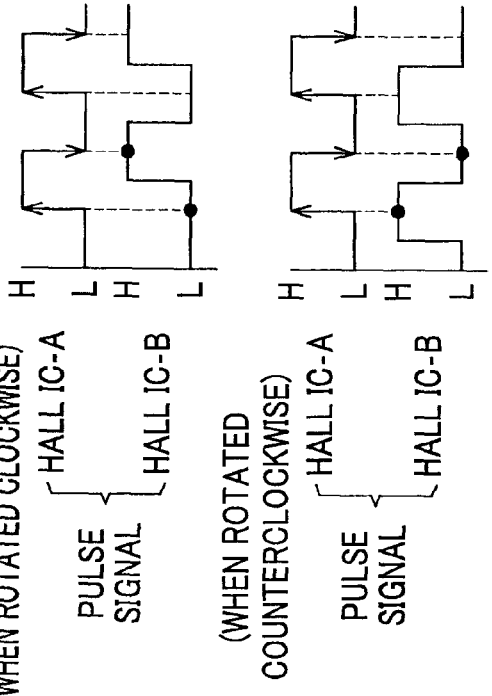
Figure 4B:
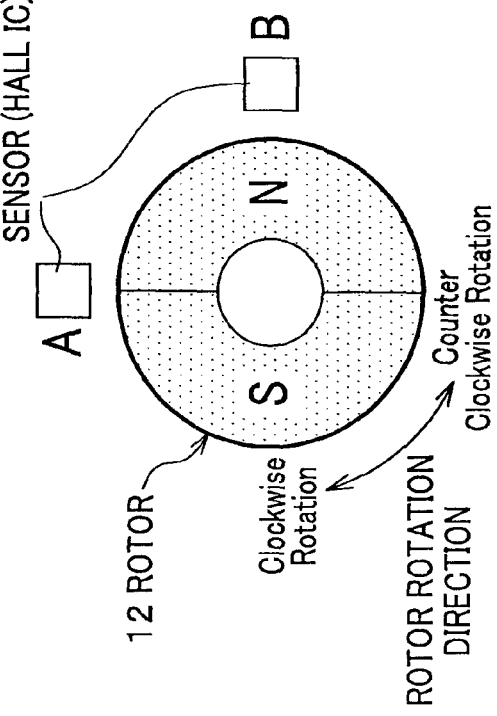

FIG. 4 explains a relation between a pulse count number and a position of the slide roof 3, FIG. 4A shows a relation between a pulse count number and a position of the slide roof 3, FIG. 4B shows a relation of positions between sensors A, B and a rotor 12, and FIG. 4C shows pulse signals output from the sensors A, B.

In a control system of an open/close part for a vehicle according to the present embodiment, the count unit 6 detects a rotating direction and a rotation number of the motor 4 which drives the slide roof 3, by counting pulse signals output from the sensors A and B, and outputs a pulse count number obtained through counting up or counting down the pulse signals referring to the mechanical lock position of the slide roof 3 as an origin.

As illustrated in FIG. 4A, the following values are pre-registered in a memory of the controller 7 (not illustrated):
  (A) A pulse count number at the tilted up mechanical lock position where the slide roof 3 is mechanically locked in the closing direction;
  (B) A pulse count number at the fully tilted up slide position, as illustrated in FIG. 2A;
  (C) A pulse count number at the fully closed slide position, as illustrated in FIG. 2B;
  (D) A pulse count number at the fully opened slide position, as illustrated in FIG. 2D;
  (E) A pulse count number at the fully opened mechanical lock position where the slide roof 3 is mechanically locked in the opening direction.

A pulse count number at a position between the fully tilted up slide position (B) and the fully opened slide position (E) is a pulse count number in the operation range at an ordinary operation of the slide roof 3 (the sliding position indicated in FIG. 2C).

A clockwise rotating direction of the rotor 12 as illustrated in FIG. 4B corresponds to an opening direction and a tilting down direction of the slide roof 3, and a counterclockwise rotating direction of the rotor 12 corresponds to a closing direction and a tilting up direction of the slide roof 3.

Here, a procedure is described referring to FIG. 4C where the count unit 6 determines if the rotor 12 rotates in the clockwise direction or in the counterclockwise direction. As illustrated in FIG. 4C, it is determined that the rotation is in the clockwise direction, if the sensor B stays at L level at the moment a pulse signal output from the sensor A rises to H level from L level, or if the sensor B stays at H level at the moment a pulse signal output from the sensor A falls to L level from H level, as illustrated in FIG. 4C. It is determined that the rotation is in the counterclockwise direction, if the sensor B stays at L level at the moment a pulse signal output from the sensor A falls to H level from L level, or if the sensor B stays at H level at the moment a pulse signal output from the sensor A rises to L level from H level. In this way, the count unit 6 outputs pulse count numbers which have been counted up or counted down, to the controller 7, for each rotating direction. (Refer to paragraphs 39 to 42, and FIG. 6 and FIG. 7 of United States Patent Application Publication No. 2006/0254148 A1 in which performance of pulse signals output from the sensors A and B is described.)

The operation range of the slide roof 3 is registered in the controller 7, as a pulse count number between the fully tilted up slide position near the mechanical lock position in tilting up operation (refer to FIG. 2A) and the fully opened slide position near the full open mechanical lock position (refer FIG. 2D). In this way, the controller 7 can output a control signal for moving the slide roof 3 between the fully tilted up slide position and the fully opened slide position, or between the fully closed slide position and the fully opened slide position, to the motor drive circuit 8, in the auto mode.

The controller 7 detects a foreign object being trapped. The detection on trapping is a means for detecting a foreign object, etc., by determining whether an operation load applied to the motor 4 exceeds a pre-determined threshold, using a signal of the operation load applied to the motor 4 which is estimated based on an operation speed of the motor 4 figured out from a signal output from the count unit 6. That is, the load detection unit within the scope of claims includes a pulse generation unit 5, a count unit 6, and the controller 7, in the present embodiment.

The controller 7 in the present embodiment, moves the slide roof 4 in the opening direction by a pre-determined distance, changing the operation mode from the auto mode to the manual mode, and stops operation of the slide roof 3, when it is determined that the operation load applied to the motor 4 exceeds the pre-determined threshold, based on a signal of the operation load applied to the motor 4. In this way, protection and safety of the motor 4 are secured, when a foreign object is trapped in the roof opening 2 by the slide roof 3, or when extra force is needed for operating the slide roof 3.

In detection on a foreign object being trapped performed by the controller 7, a detection error on detecting a foreign object being trapped may occur due to an increase of a load for trapping resulting from an error attributed to car building or caused after the vehicle is used for a long period. As mentioned above, because a detection error brought about by such causes may not occur consistently, a detection error on a foreign object being trapped may occur repeatedly, even after a serviceman concludes that the cause of the detection error is removed from the vehicle which was brought to a service factory of a dealer by a user.

Accordingly, in a control system of an open/close part for a vehicle according to the present embodiment, mode switching can be performed between an ordinary operation mode in which the controller 7 performs operation through ordinary detection on a trapped foreign object, and a check operation mode in which the controller 7 detects a trapped foreign object using a second threshold smaller than the threshold used in detection on a foreign object being trapped in the ordinary operation mode, and a service man performs checking the operation by switching the mode to the check operation mode.

A second threshold can be set arbitrarily, if the second threshold is smaller than the threshold used in the ordinary operation mode, and a second threshold according to the present embodiment is a standard number pre-determined by a manufacturer of the vehicle, etc.

First Embodiment

Hereafter, in a control system of an open/close part for a vehicle according to the present embodiment, a detailed description is given on procedures for switching the operation mode between the ordinary operation mode and the check operation mode, referring to two embodiments (refer to FIG. 1 and FIG. 4).

Figure 5:
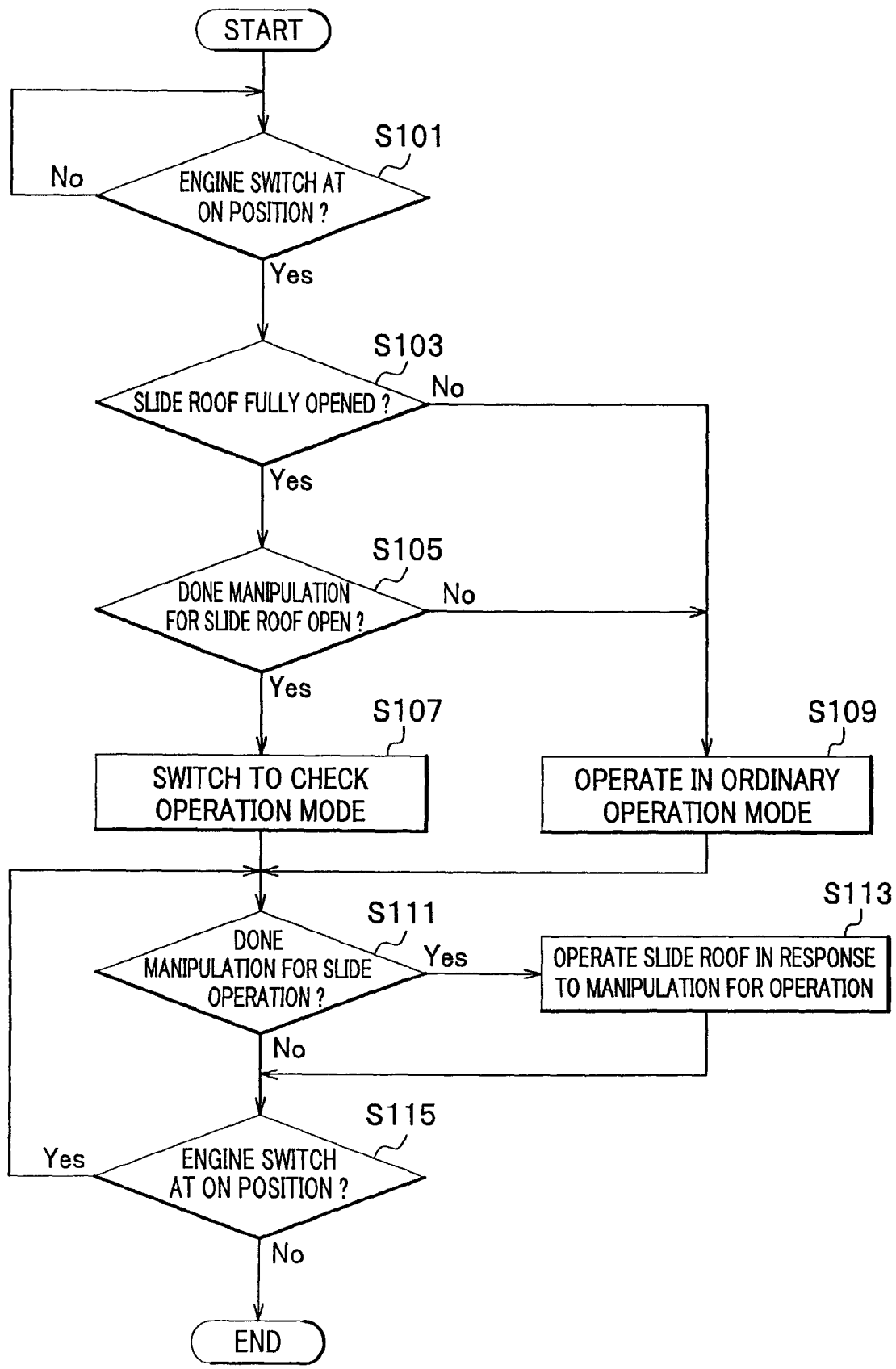
FIG. 5 is a flow chart illustrating operation of the controller according to the first embodiment of the present invention.

In the first embodiment, an operation mode of the control system of an open/close part for a vehicle is switched to the check operation mode, by a special manipulation which a user does not perform in general. Here, a case is described in which a serviceman, etc., of a service factory, takes a countermeasure against a detection error on a foreign object being trapped in the control system of an open/close part for a vehicle, and performs the checking operation of the slide roof 3. FIG. 5 is a flow chart explaining operation of the controller 7 in the present embodiment. The operation of the controller 7 is described referring to FIG. 5, accordingly.

Firstly, the serviceman who checks operation of the slide roof 3, moves the slide roof 3 to the fully opened slide position (refer to FIG. 2D), by manipulating the manipulation switch 9, and turns the engine switch of the vehicle (not illustrated) to the OFF position. At this moment, the pulse count number indicating a position of the slide roof 3 is recorded in a memory (not illustrated) of the controller 7. Then, the serviceman performs opening operation of the slide roof 3, and turns the engine switch to the ON position, by manipulating the manipulation switch 9. Here, the service man's manipulation may be a special manipulation, since a user does not perform such a manipulation in general, because of the fully opened state of the slide roof 3.

The engine switch is turned to the ON position, upon receiving a position signal from the engine switch indicating that the engine switch is at the ON position ('Yes' at Step 101), and then the controller 7 of the control system of an open/close part for a vehicle determines that the engine switch is at the ON position, and determines that the slide roof 3 opens fully (at a fully opened slide position), from a pulse count number which indicates a position of the slide roof 3, stored in a memory of the controller 7 (not illustrated) ('Yes' at Step 103).

If the controller 7 determines at Step S101 that the engine switch is not at the ON position, the controller 7 holds the operation until the engine switch turns to the ON position, and if the controller 7 determines at Step S103 that the slide roof 3 is not fully opened, operation is performed in the ordinary operation mode which performs detection on a foreign object being trapped using an ordinary threshold (Step S109).

Next, at the moment the engine switch is turned to the ON position, the controller 7 receives a manipulation signal input from the manipulation switch 9 and determines that an opening manipulation of the slide roof 3 is performed ('Yes' at Step S105), and switches the operation mode of the control system of an open/close part for a vehicle to the check operation mode (Step S107).

If the controller 7 determines at Step S105 that an opening operation of the slide roof 3 is not performed, at the moment the engine switch is turned to the ON position, operation is performed in the ordinary operation mode (Step S109).

Next, the serviceman performs an arbitrary manipulation by the manipulation switch 9 for moving the slide roof 3, and checks whether a detection error on a foreign object being trapped occurs.

Then, the controller 7 determines that manipulation of the slide roof 3 has been done by a manipulation signal input from the manipulation switch 9 ('Yes' at Step S111), and the slide roof 3 operates in response to the manipulation based on a manipulation signal input (Step S113).

If the controller 7 determines at Step S111 that the slide roof 3 is not worked, the manipulation goes to Step S115 described hereinafter. It is determined that manipulation has not been performed, if the slide roof 3 is not working within a pre-determined time.

Next, the serviceman turns the engine switch to the OFF position, after finishing the check operation of the slide roof 3. Accordingly, because a position signal which indicates that the engine switch is at the ON position is not input to the controller 7, the controller 7 determines that the engine switch is not at the ON position ('No' at Step S115), and terminates operation.

If the controller 7 determines at Sep S115 that the engine switch is at the ON position, the controller 7 accepts a serviceman's manipulation returning to Step S111. Here, an operation mode of the control system of an open/close part for a vehicle is held in the check operation mode, and the operation mode will not be switched to the ordinary operation mode, until the engine switch is turned to the OFF position (until 'No' indication appears at Step S115).

The service man performs the above mentioned checking operation and takes a countermeasure against a problem if a detection error occurs, and then, after checking that a detection error does not occur in the check operation mode, delivers the vehicle to the user.

In the control system of an open/close part for a vehicle making use of the present embodiment, it is possible to check a detection error detecting a foreign object being trapped, by switching the control system of an open/close part for a vehicle to the check operation mode, through the serviceman's special manipulation which a user does not perform in general. Here, the cost for checking is reduced, because it is possible to switch to the check operation mode without using extra tools.

If a user operates the slide roof 3, detection errors becomes less, because the control system of an open/close part works in the ordinary operation mode and performs detection on a foreign object being trapped based on a larger threshold than a second threshold in the check operation mode.

A special manipulation in this embodiment means that the manipulation switch 9 is manipulated for opening, when the slide roof 3 is at the fully opened slide position, and the engine switch is at the ON position. Each of the following other manipulations can be also used as a special manipulation: the engine switch 9 is manipulated when the engine switch is turned to the ON position; the manipulation switch 9 is manipulated for opening for a longer time than pre-determined, when the slide roof 3 is at the fully opened slide position; the manipulation switch 9 is manipulated for tilting for a longer time than pre-determined, when the slide roof 3 is at the fully tilted up slide position (refer to FIG. 2A).

Second Embodiment

Figure 6:
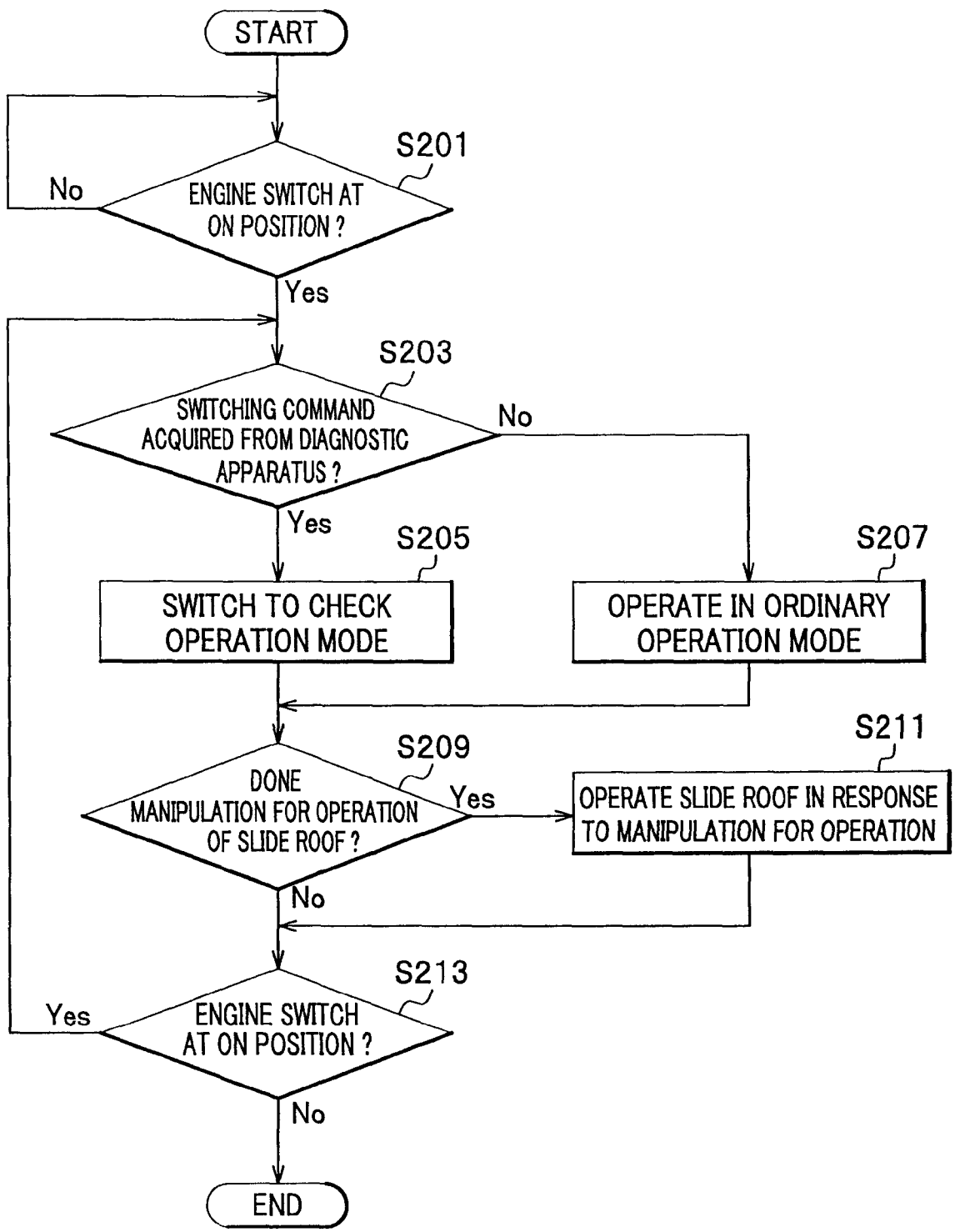
FIG. 6 is a flow chart illustrating operation of the controller according to the second embodiment of the present invention.

Next, according to the second embodiment, the control system of an open/close part for a vehicle is switched to the check operation mode, through inputting a switching command from the diagnostic apparatus 13 connected to the controller 7 of the control system of an open/close part for a vehicle, through an in-vehicle apparatus. Here, in the same way as described in the first embodiment, a case is described that a serviceman of a service factory, takes a countermeasure against a detection error on a foreign object being trapped in the control system of an open/close part for a vehicle, and performs the check operation of the slide roof 3, as an example. FIG. 6 is a flow chart illustrating operation of the controller 7 according to the present embodiment. The operation of the controller 7 is described, referring to FIG. 6, accordingly.

Firstly, the serviceman who performs the check operation of the slide roof 3, moves the slide roof 3 to the fully opened slide position (refer to FIG. 2D) by manipulating the manipulation switch 9, and turns the engine switch (not illustrated) of the vehicle to the OFF position. Then, after connecting the diagnostic apparatus 13 to the connector of the in-vehicle network installed in the vehicle, the serviceman turns the engine switch to the ON position.

When the engine switch is turned to the ON position, the controller 7 of the control system of an open/close part for a vehicle determines that the engine switch is at the ON position, receiving a position signal from the engine switch indicating that the engine switch is at the ON position ('Yes' at Step 201). If the controller 7 determines at Step S201 that the engine switch is not at the ON position, the manipulation is put on hold and to be performed after the engine switch will turn to the ON position Next, the serviceman manipulates to transmit a switching command which switches the operation mode of the control system of an open/close part for a vehicle to the check operation mode, from the diagnostic apparatus 13 connected to the controller 7 through the in-vehicle network. Due to this manipulation, the diagnostic apparatus 13 transmits a switching command to the controller 7, and the controller 7 determines that the switching command has been acquired ('Yes' at Step S203), and switches the operation mode of the control system of an open/close part for a vehicle to the check operation mode (Step S205).

If the controller 7 determines at Step S203 that the switching command is not acquired, the operation is performed in the ordinary operation mode in which a detection error on a foreign object being trapped is performed using an ordinary threshold (Step S207). Here, it is determined that a switching command is not acquired, if the switching command has not been acquired within a pre-determined time. Otherwise, it may be determined that a switching command is not acquired, if the switching command has not been acquired by the time the manipulation of the slide roof 3 is made.

Next, the serviceman performs an arbitrary manipulation which moves the slide roof 3 through the manipulation switch 9, and checks whether detection on a foreign object being trapped may occur in the arbitrary manipulation.

Here, the controller 7 determines that the manipulation of the slide roof 3 has been done when the controller receives a manipulation signal input from the manipulation switch 9 ('Yes' at Step S209), and based on the manipulation signal, the slide roof 3 operates in response to the manipulation (Step S211).

The manipulation goes to Step 213 described hereinafter, if the controller 7 determines at Step S209 that the manipulation of the slide roof 3 has not been done. Here, it is determined that the manipulation of the operation has not been done, if the manipulation of the slide roof 3 has not been done within a pre-determined time.

Next, the serviceman turns the engine switch to the OFF position, after finishing the checking operation of the slide roof 3. Through this manipulation, the controller 7 terminates the procedure, determining that the engine switch is not at the ON position ('No' at Step 213), because the position signal indicating that the engine switch is at the ON position is not input to the controller 7 from the engine switch.

Meanwhile, if the controller 7 determines at Step 213 that the engine switch is at the ON position, the controller 7 waits for a switching command from the diagnostic apparatus 13, returning to Step S203. Then, the operation mode of the control system of an open/close part for a vehicle switches to the check operation mode or to the ordinary operation mode, depending on the determination at S203.

The service man performs the above mentioned checking operation and takes a countermeasure against a problem if a detection error occurs, and then, after checking that a detection error does not occur in the check operation mode, delivers the vehicle to the user.

In the control system of an open/close part for a vehicle according to the present embodiment, miss-switching to the check operation mode by user's unintended manipulation can be prevented, because the control system of an open/close part for a vehicle switches to the check operation mode by a switching command transmitted from the diagnostic apparatus 13.

Meanwhile, in the same way as described in the first embodiment, when a user operates the slide roof 3, detection errors grow less, because the control system of an open/close part for a vehicle operates in the ordinary operation mode, and performs detection on a foreign object being trapped, using a threshold larger than a second threshold in the check operation mode.

While the embodiment of the present invention is described referring to the above mentioned two embodiment examples, the present invention is not limited to the present embodiments, and appropriate changes are possible if the changes do not depart from the content of the present invention, and the present invention is defined by technical ideas described in the scope of claims.

For example, while description is made on the control of the slide roof for a vehicle to which the present invention is applied, in the present embodiments, application is not limited to these embodiments. The present invention can be applied to all the open/close parts for a vehicle such as a power window, and a sun shade, etc., which perform open/close operation similarly. If the present invention is applied to the control system of a power window, a configuration is possible where, when the engine switch is turned to the ON position, the operation mode switches to the check operation mode if both the manipulation switches at the driver seat side power window and at the font passenger seat side power window are manipulated concurrently. Another configuration is also possible where the operation mode switches to the check operation mode, if the manipulation switch at the driver seat side power window is manipulated for opening, and the manipulation switch at the front passenger seat side power window is manipulated for closing.

A configuration is further possible where, if a pre-determined manipulation is performed by the manipulation switch of the power window at the driver seat side, the operation mode of all the power windows at all the seat sides including the driver seat side are switched to the check operation mode.

While it is determined that trapping of a foreign object occurs if an operation load calculated using an operation speed based on a change rate of pulse signals grows larger than a pre-determined threshold, detection on a foreign object being trapped can be performed using an operation load applied to the motor 4 output from the motor drive circuit 8.

While, according to the present embodiment, the operation mode switches to the check operation mode on each occasion the switching command is input from the diagnostic apparatus 13, a configuration is possible where, once the switching command is input, the operation mode is kept until the engine switch turns to the OFF position, for example.

Meanwhile, before the controller 7 determines that the control system has performed a special manipulation and the operation mode is switched to the check operation mode, the controller 7 can make the count unit 6 to learn the mechanical lock position of the slide roof 3 as a standard number of the pulse count number, through moving the slide roof 3 to the full open mechanical lock position of the slide ((E) of FIG. 4A) from the fully opened slide position ((D) of FIG. 4A).

What is claimed is:

1. A control system of an open/close part for a vehicle, comprising:
    an open/close part which can open or close, and which is installed at an opening of the vehicle;
    a driving device supplying power for operating the open/close part;
    a load detection unit detecting a load of operation applied to the driving device;
    and a controller controlling the driving device through detecting a position of the open/close part,
    wherein the control system includes an ordinary operation mode and a check operation mode for detecting an occurrence of a foreign object detection error in any manipulation for moving the open/close part,
    wherein, in the ordinary operation mode, while the open/close part is being driven, the controller performs detecting a foreign object being trapped by determining whether the load of operation applied to the driving device detected by the load detection unit is larger than a pre-determined threshold,
    and wherein, if the controller determines that a pre-determined condition based on a pre-determined manipulation is satisfied, the controller operates in the check operation mode and performs detecting a foreign object being trapped using a second threshold which is smaller than the pre-determined threshold in the any manipulation for moving the open/close part.

2. The control system of an open/close part for a vehicle according to claim 1, comprising:
    a manipulation unit which outputs a manipulation signal for operating to open or to close the open/close part;
    and an engine switch which has an ON position which indicates that an engine of the vehicle is running and outputs an ON position signal in response to the ON position,
    wherein the controller acquires a manipulation signal from the manipulation unit, when the controller acquires the ON position signal from the engine switch.

3. The control system of an open/close part for a vehicle according to claim 2, wherein, when the controller acquires an ON position signal from the engine switch, the controller determines that the open/close part is in a fully opened state and that the manipulation signal is a signal for operating the open/close part to open the control system then switching to the check operation mode.

4. The control system of an open/close part for a vehicle according to claim 1, wherein a terminal unit is connected to the controller in a communication-possible state, and the pre-determined condition is that the controller acquires a pre-determined signal from the terminal unit to switch the control system to the check operation mode.

5. The control system of an open/close part for a vehicle according to claim 1, wherein the open/close part is one of a window glass, a slide roof and a slide shade.

6. The control system of an open/close part for a vehicle according to claim 2, wherein the open/close part is one of a window glass, a slide roof and a slide shade.

7. The control system of an open/close part for a vehicle according to claim 3, wherein the open/close part is one of a window glass, a slide roof and a slide shade.

8. The control system of an open/close part for a vehicle according to claim 4, wherein the open/close part is one of a window glass, a slide roof and a slide shade.

9. The control system of an open/close part for a vehicle according to claim 1, wherein the open/close part is plural window glasses including a first window glass and a second window glass, comprising:
    a manipulation unit installed at each window which outputs a manipulation signal for operating the window glass to open or to close;
    and an engine switch which has an ON position which indicates that an engine of the vehicle is running and outputs a position signal in response to the ON position,
    wherein a pre-determined condition is that, when the controller acquires the ON position signal from the engine switch, the controller acquires a manipulation signal for operating the first window glass and a manipulation signal for operating the second window glass concurrently.

10. The control system of an open/close part for a vehicle according to claim 9, wherein the operation of the first window glass is an operation for opening and the operation of the second window glass is an operation for closing.

11. A control system of an open/close part for a vehicle, comprising:
    an open/close part which can open or close, and which is installed at an opening of a vehicle;
    a driving device supplying power for operating the open/close part;
    a load detection unit detecting a load of operation applied to the driving device;
    and a controller controlling the driving device through detecting a position of the open/close part,
    wherein, while the open/close part is being driven, the controller performs detecting a foreign object being trapped by determining whether the load of operation applied to the driving device detected by the load detection unit is larger than a pre-determined threshold, wherein, if the controller determines that a pre-determined condition based on a pre-determined manipulation is satisfied, the controller performs detecting a foreign object being trapped using a second threshold which is smaller than the pre-determined threshold, wherein the open/close part is plural window glasses including a first window glass and a second window glass, comprising:

a manipulation unit installed at each window which outputs a manipulation signal for operating the window glass to open or to close;

and an engine switch which has an ON position which indicates that an engine of the vehicle is running and outputs a position signal in response to the ON position, and wherein a pre-determined condition is that, when the controller acquires the ON position signal from the engine switch, the controller acquires a manipulation signal for operating the first window glass and a manipulation signal for operating the second window glass concurrently.

12. The control system of an open/close part for a vehicle according to claim 11, wherein the control system includes an ordinary operation mode and a check operation mode for detecting an occurrence of a foreign object detection error using the second threshold.

13. The control system of an open/close part for a vehicle according to claim 2, wherein the check operation mode continues until the engine switch is switched to an OFF position.

* * * * *